US012130593B2

(12) United States Patent
Ghassabian

(10) Patent No.: US 12,130,593 B2
(45) **Date of Patent: *Oct. 29, 2024**

(54) LUXURY SMARTWATCH

(71) Applicant: Yoram Ghassabian, New York, NY (US)

(72) Inventor: Yoram Ghassabian, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/215,763

(22) Filed: Jun. 28, 2023

(65) Prior Publication Data

US 2024/0004350 A1 Jan. 4, 2024

Related U.S. Application Data

(63) Continuation of application No. 17/822,788, filed on Aug. 28, 2022, now Pat. No. 11,868,096, which is a continuation of application No. 15/765,488, filed as application No. PCT/IB2016/056195 on Oct. 16, 2016, now Pat. No. 11,480,930.

(60) Provisional application No. 62/264,407, filed on Dec. 8, 2015, provisional application No. 62/245,301, filed on Oct. 23, 2015.

(51) Int. Cl.

| | |
|---|---|
| ***G04G 17/08*** | (2006.01) |
| ***G04B 45/00*** | (2006.01) |
| ***G04G 17/04*** | (2006.01) |
| ***G04G 19/10*** | (2006.01) |
| ***G04G 21/08*** | (2010.01) |

(52) U.S. Cl.

CPC ....... *G04G 17/083* (2013.01); *G04B 45/0092* (2013.01); *G04G 17/045* (2013.01); *G04G 17/08* (2013.01); *G04G 19/10* (2013.01); *G04G 21/08* (2013.01)

(58) Field of Classification Search

CPC .... G04G 17/045; G04G 17/083; G04G 19/10; G04G 21/08

See application file for complete search history.

(56) References Cited

U.S. PATENT DOCUMENTS

| | | | | | |
|---|---|---|---|---|---|
| 2,852,908 | A * | 9/1958 | Stern | G04B 45/046 | D10/39 |
| 5,034,932 | A * | 7/1991 | Grosjean | G04B 37/226 | 368/286 |
| 5,206,841 | A * | 4/1993 | Boucheron | G04B 37/005 | 368/283 |

(Continued)

FOREIGN PATENT DOCUMENTS

| | | | | |
|---|---|---|---|---|
| EP | 1076281 | A2 * | 2/2001 | G06F 1/1626 |

*Primary Examiner* — Edwin A. Leon
*Assistant Examiner* — Jason M Collins
(74) *Attorney, Agent, or Firm* — Ingenium Patents LLC; Peter R Kramer

(57) ABSTRACT

A system for transforming a regular smartwatch into a luxury item, comprising, a smartwatch unit including at least the display unit of the smartwatch; and a box including a housing to accommodate said smartwatch, said box having a cover being openable and closeable to cover said display unit, wherein said cover has at least one hole so that a corresponding portion of said display unit is visible to a user when said cover is in closed position, wherein when said cover is in closed position, the smartwatch unit displays the output of the smartwatch in on said corresponding portion of the display.

5 Claims, 6 Drawing Sheets

(56) References Cited

U.S. PATENT DOCUMENTS

| | | | | |
|---|---|---|---|---|
| 6,430,110 | B2 * | 8/2002 | Baroche | G04G 17/08 368/10 |
| 6,618,328 | B1 * | 9/2003 | Ellner | G04B 19/30 368/278 |
| 6,619,836 | B1 * | 9/2003 | Silvant | G04G 17/08 368/282 |
| 7,350,969 | B2 * | 4/2008 | Maire | G04B 37/0033 368/295 |
| 7,946,758 | B2 * | 5/2011 | Mooring | G04B 37/1413 368/88 |
| 8,279,716 | B1 * | 10/2012 | Gossweiler, III | H04B 1/385 455/566 |
| 8,902,714 | B2 * | 12/2014 | Gossweiler, III | G04G 21/08 368/282 |
| D759,512 | S * | 6/2016 | Belamich | D10/126 |
| D759,513 | S * | 6/2016 | Belamich | D10/126 |
| 9,785,123 | B2 * | 10/2017 | Mansour | G04B 19/283 |
| 10,139,887 | B2 * | 11/2018 | Lee | G06F 1/3278 |
| 10,268,432 | B2 * | 4/2019 | Kyung | G06F 3/147 |
| 2002/0021622 | A1 * | 2/2002 | Baroche | G04G 17/083 368/10 |
| 2003/0133515 | A1 * | 7/2003 | Kondo | H04N 21/234327 375/E7.181 |
| 2006/0158966 | A1 * | 7/2006 | Maire | G04B 37/0033 368/295 |
| 2011/0058457 | A1 * | 3/2011 | Harley, Jr. | G04B 37/0008 368/286 |
| 2011/0216627 | A1 * | 9/2011 | Ziemba | B65D 77/00 368/10 |
| 2012/0223045 | A1 * | 9/2012 | Burke, Jr. | A61J 7/0472 215/228 |
| 2016/0216694 | A1 * | 7/2016 | Kneebusch | G04G 17/08 |
| 2016/0266606 | A1 * | 9/2016 | Ricci | G06F 1/163 |
| 2016/0274544 | A1 * | 9/2016 | Counas | G04B 37/12 |
| 2017/0082978 | A1 * | 3/2017 | Schneider | G04B 19/23 |
| 2017/0364033 | A1 * | 12/2017 | Aoun | G02B 7/1824 |

* cited by examiner

LUXURY SMARTWATCH

CROSS REFERENCE TO RELATED APPLICATIONS

The present application claims priority from the US Provisional, Nonprovisional, and International patent applications listed below:

U.S. nonprovisional application Ser. No. 17/822,788, currently pending and filed on 2022 Aug. 28,
- U.S. nonprovisional application Ser. No. 15/765,488 filed on 2018 Apr. 2, issued as U.S. Pat. No. 11,480,930 B2 on 2022 Oct. 25; application Ser. No. 15/765,488 was a US National Phase application under 35 USC 371 of,
- International Application PCT/M2016/056195, filed on 2015 Oct. 16, expired,
- U.S. provisional application No. 62/245,301 filed on 23 Oct. 2015,
- U.S. provisional application No. 62/264,407 filed on 8 Dec. 2015.

The applications listed above, Ser. Nos. 17/822,788, 15/765,488, PCT/IB016/056195, 62245301, and 62264407, are hereby incorporated by reference.

BACKGROUND OF THE INVENTION

Smartwatches are electronic devices that hardly can replace a traditional and/or luxury watch on the wrist. A number of attempts to produce and promote smartwatches by electronic device manufacturers have been provided but the smartwatch has never become mainstream like a wristwatch because of several factors such as its appearance, the life of the battery, etc. In fact, unlike the traditional wristwatch, the screen of a smartwatch is most of the times turned off automatically to save power or many times turned off because the power source (e.g. herein may be referred to as the battery) is empty making the current smartwatches unusable and therefore undesirable by most of the public. In order to become mainstream, the smartwatch must become a luxury item resembling to a traditional smartwatch and be distributed by watch, jewelry and fashion manufacturers and/or channels. For such purpose, preferably, the technology manufacturers (e.g. OEMs, ODMs) may produce smartwatch components and the corresponding software (e.g. Operating System) preferably in form of a module/unit (e.g. and, and the watch/fashion manufacturers preferably may dress said module by accommodating it within a luxury envelope/case (e.g. herein may be referred to as a box) by giving to the combined module and box the appearance of a luxury wristwatch which functions like a smartwatch. Such a combined product may herein be referred to as a luxury watch.

SUMMARY OF THE INVENTION

In order to become popular, smartwatch must have a traditional and/or luxury (wristwatch) appearance. This issue is being addressed in this patent application. In this patent application a number of principles are described and shown through exemplary figures and descriptions. It must be noted that other examples and/or products based on principles described herein may be considered by people skilled in the art.

According to an exemplary aspect, at least most of the components of a smartwatch (e.g. hardware and software (e.g. herein may be referred to as smartwatch mechanism, smartwatch module, etc.) preferably in form of a module is integrated within a watch box having a housing to accommodate said smartwatch mechanism and a cover that preferably includes a (e.g. traditional/physical/hard) wristwatch dial (e.g. herein may be referred to as a disc). Preferably, the smartwatch module includes a display unit (e.g. herein may be referred to as a screen) to display at least the virtual hands of a watch face and/or any of the other output contents of a smartwatch. Preferably, the disc has a hole/window so that, when the cover is in closed position, at least a portion of the (e.g. surface of the) display unit of the smartwatch is visible to a user. According to a preferred method, when the cover is in closed position, the output content of the smartwatch is directed/printed in said visible portion of the display unit. In this case according to one method, preferably, the rest (e.g. the covered portion) of the display unit is turned off to save power.

Preferably, the system automatically recognizes that the cover is in closed position or in open position. Alternatively, the user informs the system that the cover is in closed position or is in open position, by for example providing an (e.g. a predefined) interaction. When the cover is in open position, preferably, the output content of the smartwatch may be printed in a larger scale and/or anywhere on the display unit.

Preferably, said display unit is a touch screen. Optionally, said display unit is not touch sensitive. Note that in this application the terms "display unit" and "screen" are preferably/usually used for the same meaning/purpose.

Preferably, the cover is openably and closably attached to the housing of the box. Preferably, a hinge is used to open or close said cover. Optionally other opening and closing means (e.g. a sliding means) are used for the same purpose.

Preferably, when the cover is in closed position, a/the visible portion of the display unit displays a watch face (e.g. in reduced size in accordance with the size of the corresponding hole in the cover). Preferably said watch face is the virtual hands of a watch. Preferably, the physical disc includes at least a portion of the interface such as a dial of a wrist watch so that the combined smartwatch module and the box (e.g. the luxury watch (surface)) resemble to a traditional (e.g. wrist) watch displaying time. Optionally, said virtual watch face also displays the rest of a virtual watch face (e.g. also displays a virtual watch dial and/or more).

Preferably, a battery power source separately from the main power source (e.g. relating to most of the functionalities) of the smartwatch is used to display time on the screen of the smartwatch in general and in the portion of the screen corresponding to the hole of the cover in particular such that said battery power source lasts much longer than said main power source. Alternatively, the main power source supplies power to display any content (e.g. notifications, watch face/hands/dial, etc.).

It is therefore the purpose of this patent application to provide principles and methods to produce wrist-mounted and none wrist-mounted devices that have the appearance of a traditional (e.g. wrist) watch (e.g. when the cover is closed) and the appearance and functionality of a smartwatch (e.g. when the cover is open).

DETAILED DESCRIPTION OF THE INVENTION

Figure 1:
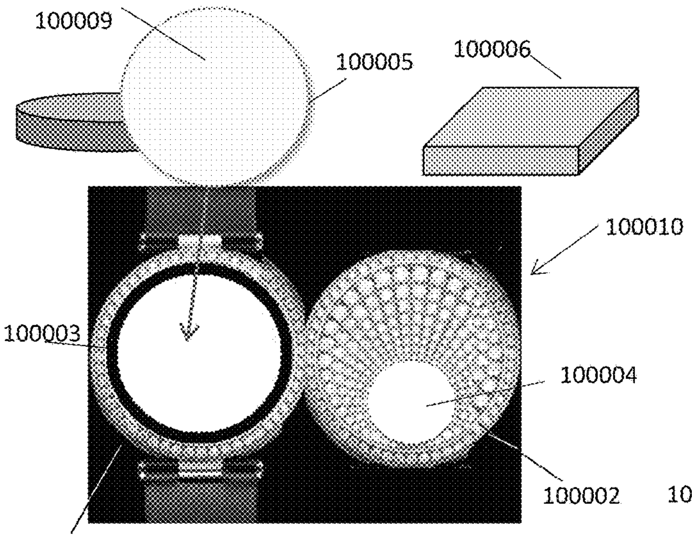
FIGS. 1-6, show the principles of integrating a smartwatch module within a box in accordance with different exemplary embodiments of the invention.

According to one embodiment of the invention, the components of a smartwatch preferably in form of a smartwatch module unit/module can be implemented within a (e.g. luxury) box preferably having a watch appearance (e.g. herein may be referred to as a watch box or box). The components of the smartwatch unit may preferably be in form of a smartwatch module and may include a display unit (e.g. a touch screen). Said components may preferably be removably inserted within and/or extracted from the watch box. Preferably, the smartwatch unit and the watch box can be manufactured separately. The watch box may have a base/housing to preferably accommodate at least most of the components the smartwatch (e.g. the smartwatch module), and a cover. The smartwatch module may be accommodated/fixed within the housing by using any type of accommodation means/fixture. The watch box may preferably have a cover to cover at least a portion of the surface of the display unit of the smartwatch. Preferably, the cover of the watch box may have at least one hole. Preferably, at least a portion of the display surface of the smartwatch may be visible and/or accessible (e.g. responding to a touch) (e.g. through the/a corresponding hole) to the user while the smartwatch is preferably covered by said box cover.

The smartwatch module can have any shape and/or any size. An attachment/fixing component may be used within the housing and/or with the smartwatch unit to attach/fix the smartwatch unit within the housing.

Preferably, the (e.g. the external) side of the cover of the watch box is designed such that to resemble to/have a conventional (e.g. wrist) watch unit design preferably having a (e.g. preferably mechanical/hard) watch dial. Preferably, when the cover is in closed position, the smartwatch display unit may display output contents (e.g. of the smartwatch) such as a virtual watch face, the movable virtual hands related to showing time, notifications, date, pictures, video, text, etc. through a (e.g. one or more) on the portion of the display surface corresponding to a (e.g. one or more) hole of the cover so that a user can see and or interact with said portion of the display surface. Preferably, the size and the location of an output content is such that to match (e.g. approximately, at most) the size and/or the location of the hole so that to (e.g. preferably entirely, optionally partially) be visible/accessible through said hole. The virtual watch face/hands may have any design and can be interchanged automatically upon an event of manually by a user. At any instant, the system automatically and/or the user manually may be able to select/change the virtual watch and/or a content among a number of choices (e.g. among a number of watch faces/hands and/or other contents) (for example by touching (e.g. tapping on, gliding on, etc.) the display surface (e.g. through the hole), by flicking the watch/wrist, etc.

By combining the beauty of a traditional/physical watch dial within the watch cover and a virtual watch face/hands which is visible through the/a hole, a beautiful and/or luxury smartwatch device may be created. For example, the cover and/or housing may have antic design, may be made from precious materials (e.g. gold), include precious stones (e.g. diamonds), etc.

Note that, the/an uncovered portion of the display surface (e.g. visible and/or accessible through a hole) may also display any one or more other contents such as notifications, messages, pictures, videos, etc.

According to one embodiment, the user may interact with the uncovered portion of the display unit (e.g. the portion visible and/or accessible through the/a hole) to access the (e.g. corresponding) content displayed (e.g. displayed on said portion) on the screen. As an example, the user may interact with said uncovered portion to change the content displayed on it. For example, such interaction may result in changing/scrolling watch faces/hands (e.g. by sliding on said portion of the display/touchscreen), removing a notification displayed on the uncovered portion (e.g. by tapping on said portion), opening a message corresponding to a notification appeared/displayed on said uncovered portion, etc. According to one method, the content displayed on said portion may vary based on one or more conditions/events. As an example, by default said portion may display a virtual watch hands/face and when a notification arrives it may replace or be added to said watch hands/face (e.g. for a while). Optionally, for example, said notification may be printed within (e.g. above) the virtual watch hands/face within said portion of the display surface.

The cover may have more than one hole. It can have multiple holes (e.g. several holes, a grid shape cover, etc.) all having the same shape and/or any of them may have a different shape, size, etc. (e.g. when the cover is in closed position) This may give a beautiful live appearance to the luxury smartwatch watch. For example, the display unit of the smartwatch unit may display different one or more colors (e.g. over time, manually or automatically) and/or backgrounds giving the watch box/cover device a live appearance (e.g. colors can be seen through at least some of said holes). The user may select the color/s of the display for such purpose. Selecting any content such as color, background design, etc. of the display may be made automatically by the system and/or manually by the user (e.g. for example by interacting with (e.g. touching/sliding on) the display (e.g. through the hole), by flicking the smartwatch, user's corresponding wrist, etc.).

If the cover has several holes, according to one method, preferably at least each of one or more of said holes may be related to a different content on the screen.

When the cover is in open position, substantially the entire display unit may become available. The smartwatch system may display any content dedicated to the smartwatch preferably on a large scale and/or anywhere on the screen. For example, the user may use any application such as a messaging application to see messages, type messages on an on-screen keyboard displayed on the display unit of the smartwatch, receive and send messages, view pictures or videos, etc.

Note that the smartwatch module can have any shape and/or size.

FIGS. 1-6 show examples of the principles described herein. FIG. 1 shows a number of smartwatch units/modules, including a round one 100005 having a display unit (e.g. a touch screen) 100009 and a square one 100006 also having a display unit. FIG. 1 also shows a watch box 100010 having a housing 100001 and a cover 100002. The housing has an accommodation means 100003 to accommodate a smartwatch module 100005 and the cover has a hole 100004. In this example, the cover is shown in open position.

Figure 2:
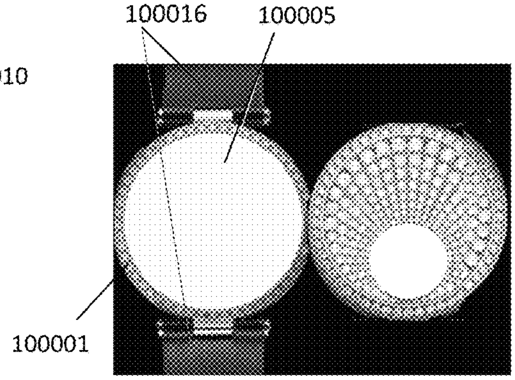
Figure 3:
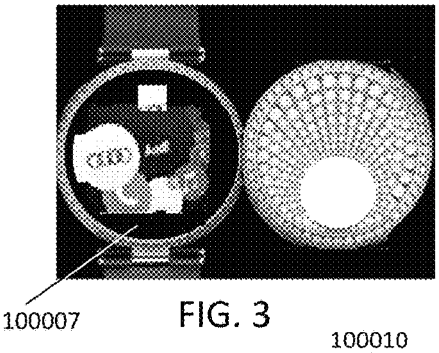
Figure 4:
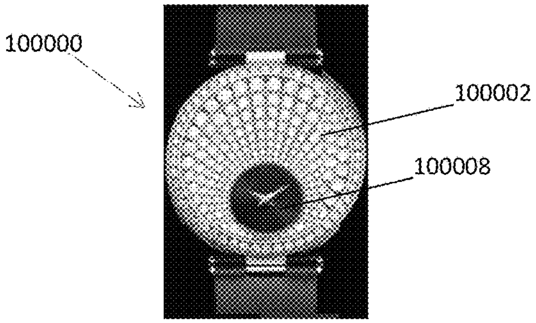

In FIG. 2, the/a smartwatch module 100005 is accommodated within the housing 100001. As shown in the example of FIG. 3, (e.g. preferably when the cover is in open position) substantially the entire screen/surface of the display of the smartwatch unit is used to display contents 100007 on the screen. FIG. 4 shows the luxury smartwatch (e.g. the box including the smartwatch unit/module. Herein may be referred to as the luxury smartwatch) 100000 wherein the cover 100002 is in closed position. As shown here, when the cover 100002 is in closed position the system may preferably (e.g. after a predefined laps of time of not using the smartwatch and/or not interacting with the (touch) screen, etc.) automatically display a (e.g. another) content (e.g. a virtual watch face/hands) 100008 corresponding (e.g. in a small scale) to a/the hole/s 100004 of the cover so that to be visible and/or accessible to the users. As mentioned before, as demonstrated in FIG. 6, the user can also manually cause the system to provide such content/s 100008 dedicated to the hole/s 100004 (e.g. before and/or after closing the cover). Note that in this example, the housing of the box is attached to a strap 100016 by hinges.

According to one embodiment, preferably by default, the content displayed on the uncovered portion (e.g. corresponding to a hole within the cover) of the display unit of the smartwatch module may be adapted to the size of the hole and/or to its location. An interaction such as a (e.g. long) pressing action on said portion/content (e.g. while the cover is in open position or in close position) may enlarge the size of the said content and/or may provide another (e.g. enlarged) (e.g. related or unrelated) content on the screen (e.g. or vice versa).

Alternatively, the principles just described may be applied to an automated system wherein when the cover is in closed position, a second content preferably in a reduced size is displayed on the portion of the screen that corresponds to a hole, and when the cover is in open position, a first content (e.g. related or unrelated to said second content) is displayed preferably in a larger scale and/or in any location on the screen.

Note that the watch box may have additional/more than one holes (e.g. in the cover and/or or in the housing of the box (e.g. for access to the charger, camera, microphone, side button, etc.) of the smartwatch unit.

The cover of the watch box may be opened and closed by using any type of means such as hinges, sliding components, rotating means, etc.

Preferably, the display surface of the smartwatch is a touch sensitive (e.g. a touch screen).

Note that any kind of alerting means may be used to inform the smartwatch system that the cover is in open or close position. For example, an optical means, a sensor, a node, etc., may be integrated with the smartwatch unit and/or with the watch box (e.g. cover). For example, the inside face of the cover may include a node such that when the cover is in closed position the node touches or is very close to a component (e.g. the touch screen) of the smartwatch unit (e.g. at a predefined location) to inform the (e.g. the operating system of the) smartwatch unit that the cover is closed. Accordingly, when the cover is opened, the node may preferably not touch said component or it may not be close to it, informing the smartwatch system that the cover is open position. Note that the node is preferably made of materials that the touchscreen can sense it (e.g. when it touches the touchscreen or when it is very close to the touchscreen).

Figure 5:
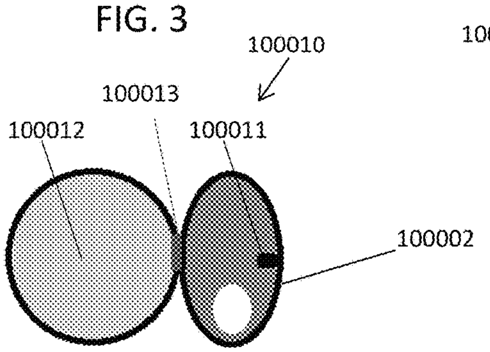
Figure 6:
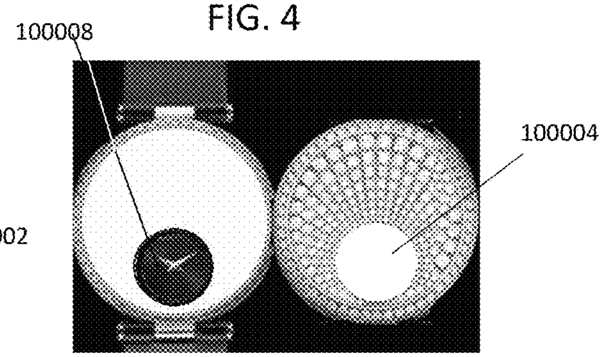

FIG. 5 shows a/said luxury smartwatch 100010 wherein its cover 100002 is in an open position. As shown, the inside face of the cover includes a node 100011 that may touch (e.g. or may be close to) the screen 100012 of the smartwatch unit when closing the cover. In this example, a hinge 100013 is used for opening and closing the cover.

By providing a smartwatch system/device as described above wherein preferably the (e.g. accessible and/or visible portion of the) display unit of the device is preferably (e.g. substantially) smaller when the cover is in closed position than when the cover is in open position, a beautiful and practical smartwatch having a conventional (e.g. wrist) watch appearance may be created which may be greatly acceptable by public. Such a device can have a very large size and still be acceptable and/or pleasant to the eye (e.g. a traditional smartwatch with a large display (e.g. without cover) looks like a gadget and may not be acceptable by people).

Note that the cover may also include a (e.g. at least one additional) conventional/physical/hard watch (e.g. to show time, chronometer, etc.) regardless/independently of the smartwatch module.

Preferably, the cover of the box may be detachable from the housing so that different covers may be interchangeably attached to/used with a same watch housing, or vice versa.

Note that the principles described above may not be limited to a smartwatch. The box described herein may have any size and shape and be designed to incorporate any other (e.g. electronic) unit such as smartphone unit, etc.

According to one embodiment, a (e.g. one or more) predefined interaction with the watch box may control at least some (e.g. one or more) of the functions of the smartwatch and vice versa. As an example, the cover may have a physical crown wherein rotating said crown may for example be related to selecting an application, providing commands to an application (e.g. scrolling watch faces/hands to select one), etc. Also as an example, the processor of the smartwatch unit/module may control some (e.g. one or more) functions assigned to the (e.g. cover of) the watch box such as rotating the hands of the (e.g. physical) watch of the cover that show the time, etc.

Figure 14:
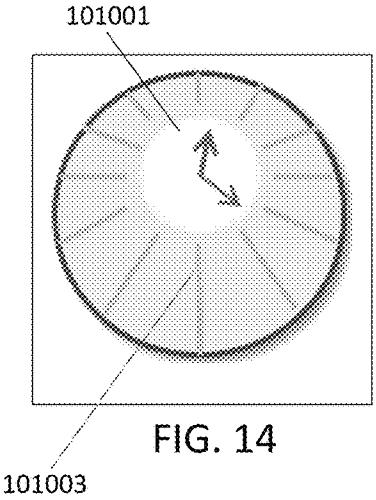
FIGS. 14-17, show the principles of displaying time on the visual portion of the display in accordance with the watch dial of the cover of a box according to different exemplary embodiments of the invention.

According to one embodiment, (e.g. at least a portion of) the display unit of the smartwatch module may display a/some content in (e.g. visual) relationship with the cover (e.g. see FIG. 14 described later herein).

Note that any (e.g. one or several) uncovered portion of the screen may display one (e.g. same or different) or several contents (e.g. several notifications, watch hands and notification/s together, etc.) at the same time and/or at a different time.

According to one method, interacting with a first uncovered portion of the display may control the content of a second uncovered portion of the display.

Figure 7:
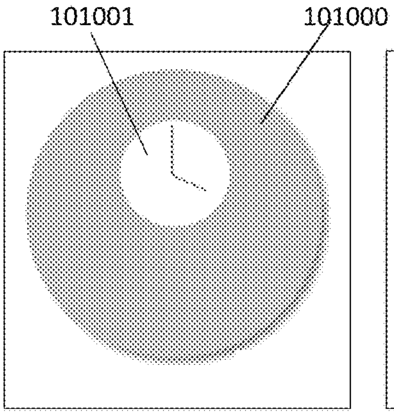
FIGS. 7-13, show the principles of displaying contents on the screen of a smartwatch in accordance with the window/hole of the cover of a box according to different exemplary embodiments of the invention.
Figure 8:
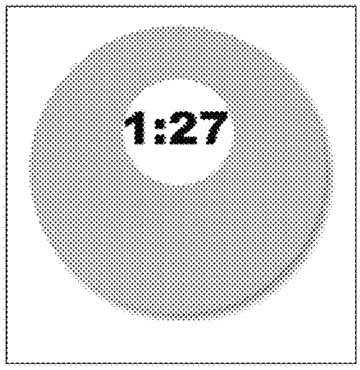
Figure 9:
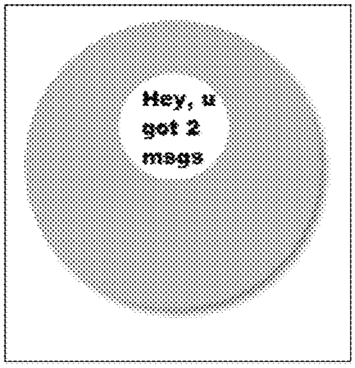
Figure 10:
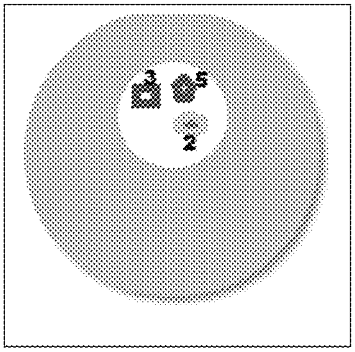

Some of the principles described herein are demonstrated in several drawing hereafter:

FIG. 7 shows the cover 101000 of a watch box in the closed position. In this example, a portion of the display of the smartwatch unit is visible/accessible through the hole 101001. In this example, said portion displays a virtual watch (e.g. a virtual analog design). In FIG. 8 said portion displays another virtual watch (e.g. in this example, a virtual digital design). In FIG. 9, said portion displays a notification (e.g. just arrived and replaced the virtual watch). In FIG. 10, said portion displays a plurality of notifications.

Figure 11:
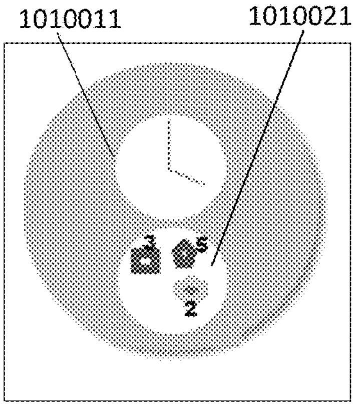
Figure 12:
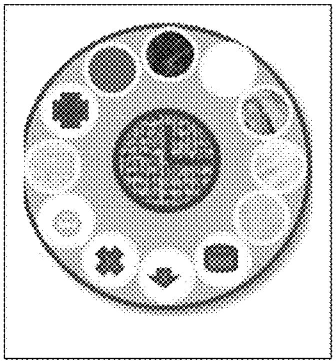
Figure 13:
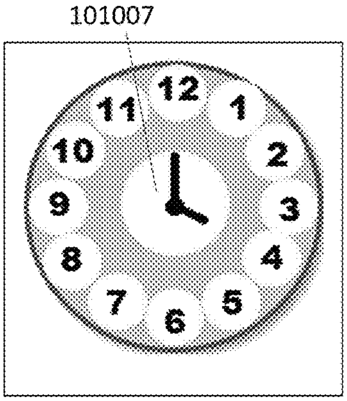

FIG. 11 shows the cover of a box having two holes 1010011 and 1010021 each displaying a (e.g. one or more) different content. In FIG. 12 the cover of the box has many holes each assigned to a (e.g. one or more) different content of a same application or of a number of applications. Preferably, interacting with one of said contents may activate the corresponding content and/or another content. In the example of FIG. 13 a virtual watch face is displayed. In this example, the center portion of the display unit relating to the center hole 101007 of the cover displays a virtual watch hands and the surrounding portions of the display unit relating to the surrounding holes of the cover display virtual digits of a/said virtual watch.

The design of the (e.g. physical) cover (e.g. including at least a watch dial) and the virtual watch (e.g. face/hands) of the smartwatch may be such that (e.g. when the cover is in closed position) together they may emulate/simulate/look like/resemble/form a regular (e.g. conventional) (e.g. wrist) watch (face). In the exemplary FIG. 14, the uncovered portion 101001 of the display of the smartwatch (e.g. which is under/in the hole of the cover) displays a virtual watch (hands) and the dial portion of the cover has physical bars relating to hours (e.g. the bar 101003 relating to 6 o'clock). In this example, the bars correspond/are related to the hands of the virtual watch (e.g. to show time. In this example, 12:22 pm or 00:22 am).

Figure 15:
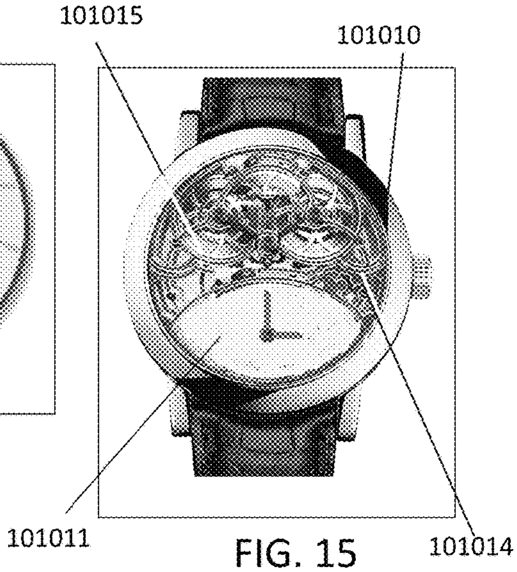

Many other designs combining the cover and a virtual content displayed under a hole of the cover may be considered. In the exemplary FIG. 15, the cover 101010 includes (e.g. static) mechanical (e.g. dummy) hardware 100014 of a physical watch. In this example, the portion of the display of the smartwatch corresponding to the hole 101011 may displays a virtual watch hands. A moving virtual content (e.g. 101015) simulating a portion of a mechanical/physical watch (e.g. rotating circles) may be displayed on the display of the smartwatch and be visible through many empty spaces/holes in the mechanical/hardware cover. According to one embodiment, said virtual content (e.g. combined with said cover and said hardware cover) may give the impression of a working mechanical watch.

Figure 16:
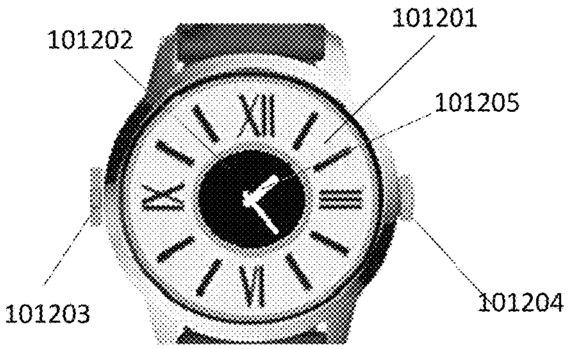

FIG. 16, shows a luxury smartwatch having a (physical) hardware cover 101201 wherein the cover includes hard Roman numbers and bars (e.g. forming a hard/physical watch dial) preferably resembling to those of a traditional watch dials. Said cover is openably and closably attached to the housing of the watch box by using hinges 102203. In this example, preferably when the cover is closed position, at least a substantial portion of the display unit of the smartwatch module (e.g. preferably at least the portion of the display unit which is hidden under the cover) is preferably turned off to reduce the power consumption. In this case, preferably, principally only the visible portion 101202 of the display unit displays specific contents relating to a/some specific/selected functionalities, applications, etc., that are (re-) directed to said portion 101203 of the display unit (preferably) when the cover is in closed position. In the current example, said portion of the display (e.g. and preferably the entire display) is displaying (e.g. only) a (small) virtual watch hands 101205 which significantly saves power while in combination with the watch box (e.g. hard/physical) cover (e.g. including the hard watch dial) gives to the overall luxury watch (e.g. surface) the resemblance of a traditional watch (face/surface).

Note that said specific contents may include any type of content such as for example, notifications received by the watch, a chronometer, date, a photo, a video, a text, an incoming call alert, etc. Note that based on a/some condition/s, at a different time, said (e.g. uncovered) portion of the display may show a different content and/or may show more than one content.

Note that said specific contents may be selected by a user or automatically by a corresponding system.

Figure 17:
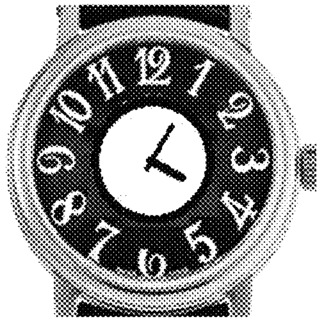

In FIG. 17, the watch cover includes a watch dial having (physical) numbers.

Figure 18:
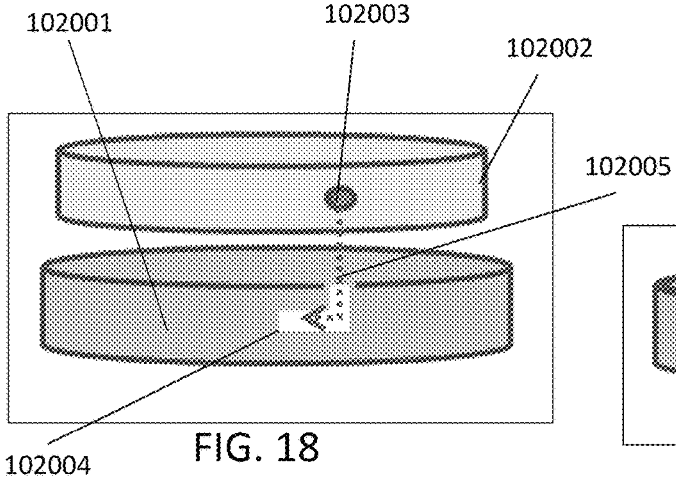
FIGS. 18-23, show the principles of integrating a smartwatch module within a box in accordance with different exemplary embodiments of the invention.
Figure 19:
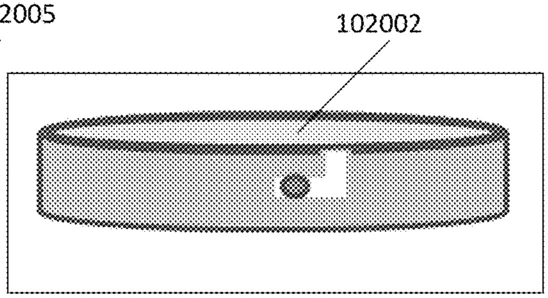

Different attachment means may be used to accommodate the smartwatch unit/module within a watch box. In the exemplary FIG. 18, the (e.g. wall of the) housing 102001 of a watch box includes an empty portion/hole 102004 having a specific shape so that to slide an external button 102003 of the smartwatch unit within it. By providing an action including pushing the smartwatch unit 102002 inside the housing in a manner to be able to slide the external button 102003 in said empty portion 102004 (e.g. see the direction arrow 102005) (e.g. and rotating the smartwatch in the housing), the smartwatch unit may be safely accommodated/fixed in the housing of the watch box. FIG. 19 shows the smartwatch unit 102002 after being accommodated in the housing of the box. Note that the smartwatch can be detached from the body by reversing said action.

Figure 20:
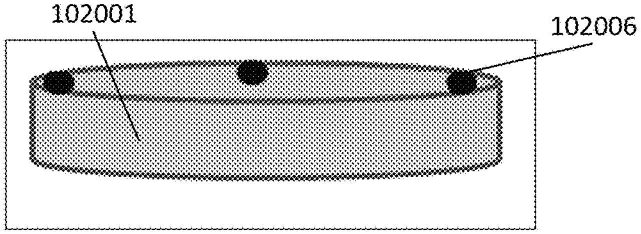

FIG. 20 shows another example of a means to safely accommodate/fix the smartwatch unit in the housing of a watch box, In this example, the housing 102001 of the box may include (e.g. rubber) nodes (e.g. 102006) so that the user can push the smartwatch unit within the housing and the nodes keep it safely accommodated/fixed in the housing.

According to one embodiment, different types of smartwatch units may be integrated within a single smartwatch housing using an (e.g. one or more different) accommodating component. An accommodating component may be used to adapt a smartwatch unit within the housing of a box. For such purpose, according to one method, different accommodating means preferably having a unique (e.g. exterior) shape and/or size, and preferably having different accommodating housings (e.g. holes with different shape and/or size within said accommodating means) may be used to adapt/accommodate different smartwatch units within preferably a single watch box housing. The accommodation means may preferably be removable and/or replaceable.

Figure 21:
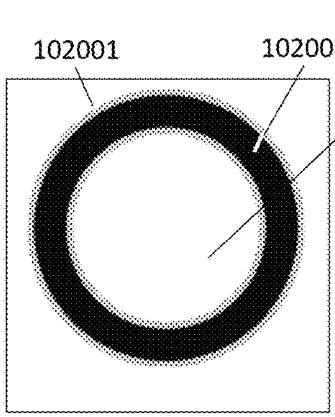
Figure 22:
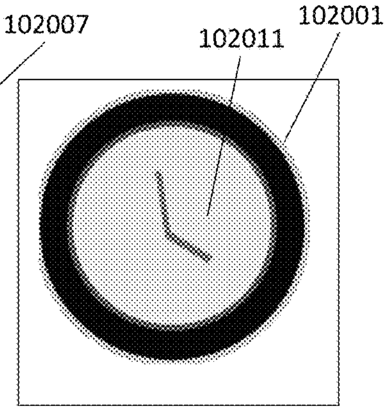
Figure 23:
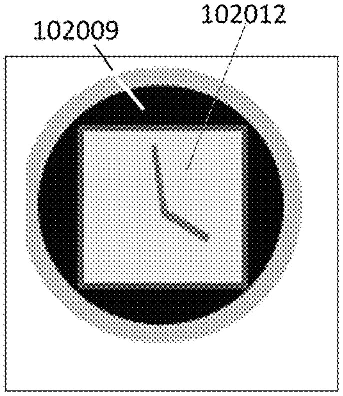

The exemplary FIGS. 21 and 22 show an accommodation means 102008 (e.g. made from rubber, plastic, etc.) used to accommodate a (e.g. small) round smartwatch unit 102011 within a larger round housing 102001 of a watch box. By implementing such an accommodation means 102008 in said housing 102001 a smaller housing 102007 is created within the original housing 102001. In the exemplary FIG. 23 the accommodating component 102009 is used to accommodate a square smartwatch unit 102012 within a/the round housing of a/the watch box.

Note that, the cover of the box may have a housing to accommodate at least a portion of the smartwatch unit/ mechanism. In this case, preferably, when the cover is in closed position, the display component of the smartwatch unit may be located face to the user's wrist and in the open position, the display is preferably face to the user's face.

Note that preferably at least a portion of the bottom of the housing of the box may have a hole/be empty. This may have some advantages such as to permit to reduce the height/size of the watch box, to permit to extract the smartwatch from the housing of the box by pushing the smartwatch unit through said hole towards outside.

Figure 24:
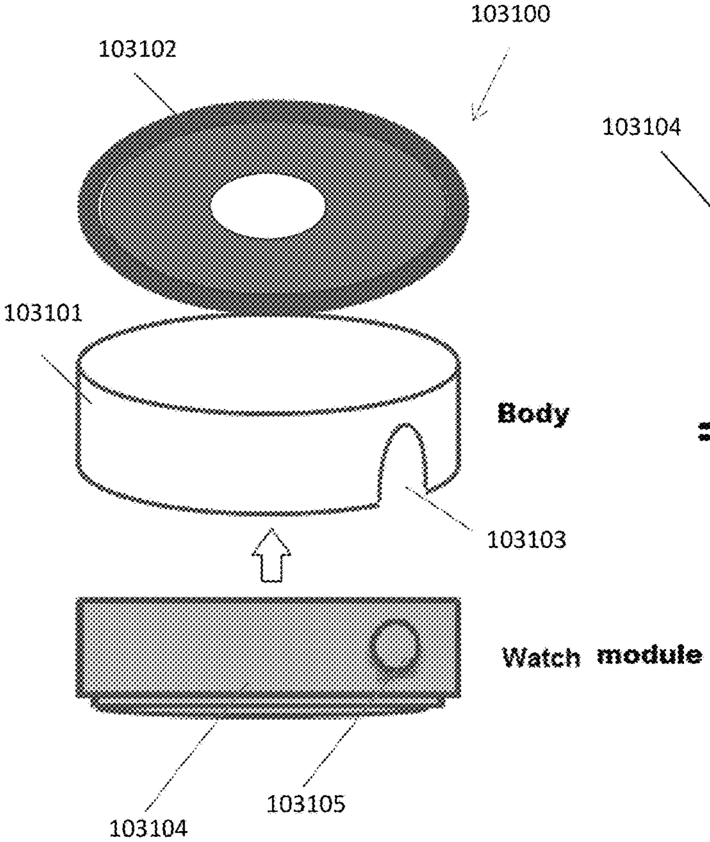
FIG. 24, shows the principles of integrating a smartwatch module within a box in accordance with a different exemplary embodiment of the invention.
Figure 25:
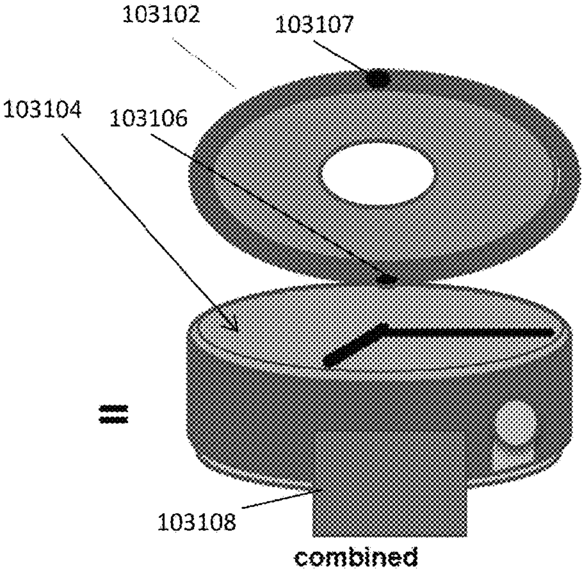
FIG. 25, shows the principles of integrating a smartwatch module with a cover in accordance with a different exemplary embodiment of the invention.

The smartwatch unit and the box may have any shape and may be integrated together by any means, methods, etc. According to one embodiment, the smartwatch module may be entered/integrated from the bottom of the housing into the housing. As an example, FIG. 24 shows a box having a housing 103101 and a cover 103102. Said box is preferably designed to accommodate (e.g. the components of) a smartwatch (e.g. a unit/module) 103104 from the bottom of the housing. Note that in this example, the housing has a hole in the bottom to accommodate the smartwatch from the bottom. The housing also may have a hole 103103 in its side wall to accommodate the side button 103105 of the smartwatch module 103104. FIG. 25 shows the smartwatch module 103104 after being accommodated within the watch box/housing. In this example, the cover 103102 of the box is in open position and preferably therefore the/a virtual watch face (e.g. in enlarge state) occupies the entire/a large portion of the screen.

In the current example, a speaker (and/or a microphone) 103106 may be located in the luxury watch in a manner such that when the cover 103102 is on open position the (most of) the audio is directed to the user's face (e.g. ear). Also as shown, a (e.g. one or more) camera may be integrated inside 103107 and/or outside (not shown) of the cover 103102 to take photos. According to one system, the inside face of the cover may also have a display unit (e.g. to show a photo being taken). In this example, the cover opens in the axis of the strap 103108. It must be noted that the cover may be opened or closed in any axis.

Figure 26:
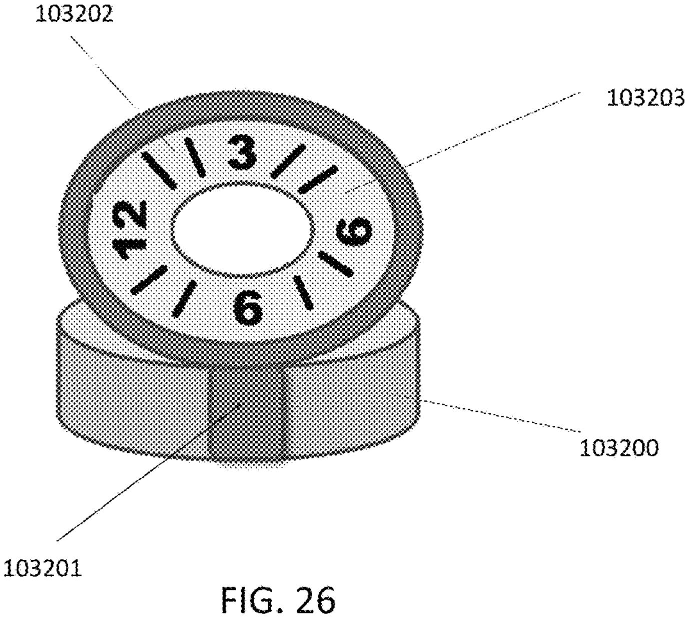
FIG. 26, shows an example of a simplified method/system to transform a regular smartwatch into a luxury item.

FIG. 26 shows an example of a simplified method/system to transform a regular smartwatch into a luxury item. In this example, the watch box has (e.g. only) a reduced/partial housing 103201 attached to the cover 103202 having the physical dial element 103203. Said reduced housing is used to accommodate an entire smartwatch or a smartwatch module 103200 such that only the front face of the smartwatch is covered by the cover 103202 and substantially all other portions (e.g. except the portion covered by the partial housing) of the surface/body of the smartwatch are not covered by the box. In this example, the smartwatch substantially keeps its original form factor but becomes covered by the cover of the housing when the cover is in closed position, giving the smartwatch an appearance of a luxury smartwatch.

As mentioned before, the cover of the watch box may have more than one hole/window. As an example in addition to a first hole dedicated to a (e.g. one or more) first content, at least one other hole of the cover may be dedicated to displaying re-directing a (e.g. one or more) second content (e.g. such as date, chronometer, etc.) on the portion of the display corresponding to said at least one other hole of the display unit of the smartwatch.

Note that the term "(re-)directing" used in this application generally means to print a content relating to an application, function, etc., in a first form factor (e.g. small, partial, different) in a zone/portion of the display unit of the smartwatch that can be/is viewed through the corresponding hole of the cover (e.g. when the cover is closed position) to a user. As mentioned herein, said content relating to an application, function, etc., may be displayed in a second form factor (e.g. differently such as large, non-partial, different than said first form factor, etc.) when the cover is in open position.

Figure 27:
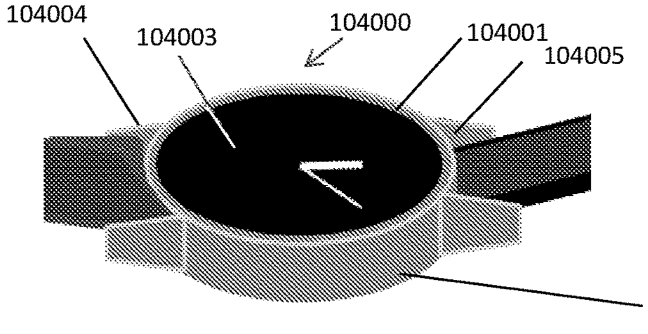
FIGS. 27-30, show the principles of integrating an entire smartwatch within a box in accordance with different exemplary embodiments of the invention.
Figure 28:
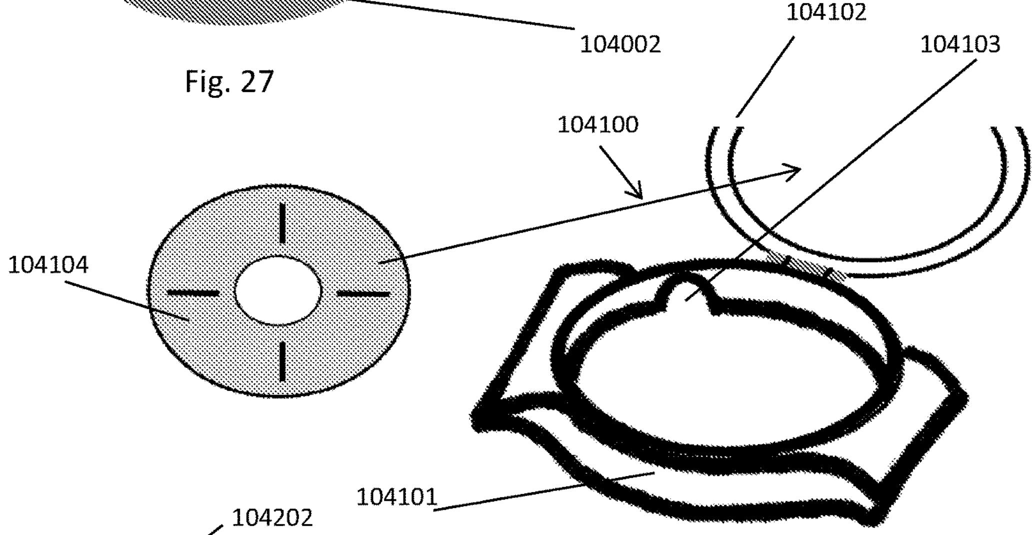
Figure 29:
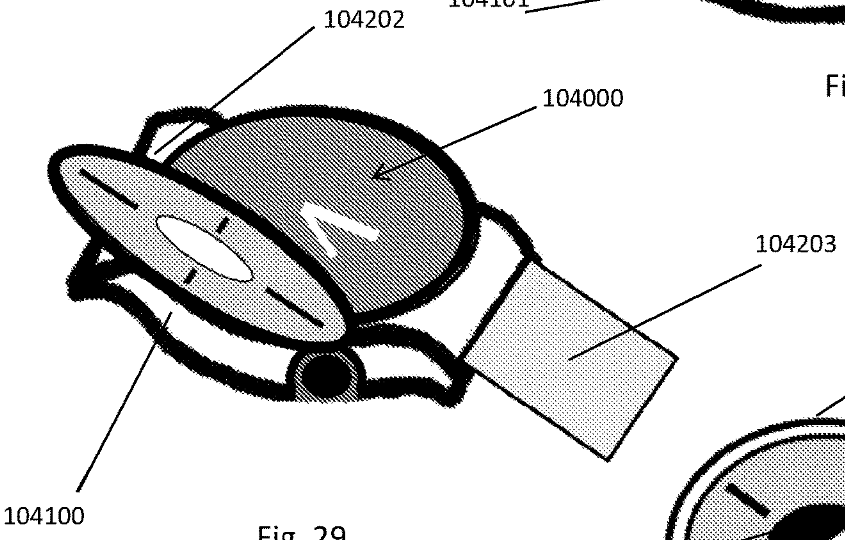
Figure 30:
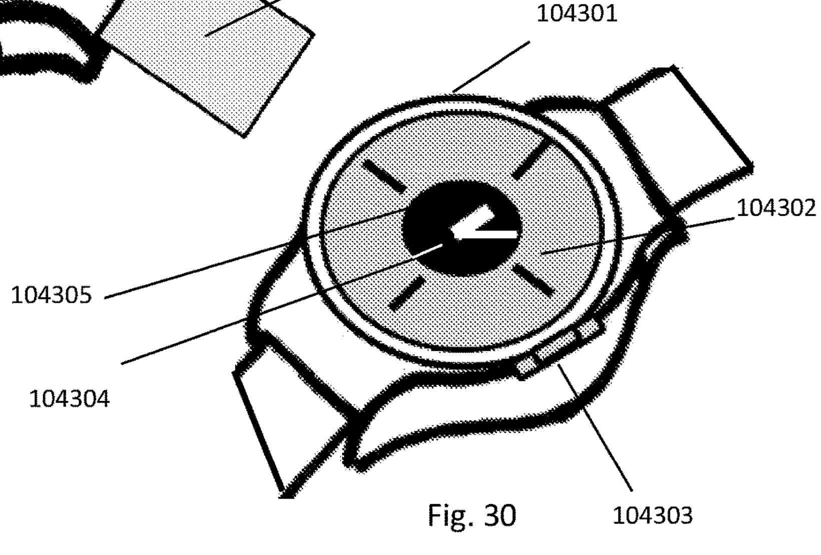

According to one embodiment, an/the entire smartwatch (e.g. including its horns) may be considered as a smartwatch module/unit and be integrated within a box. As an example. FIG. 27 shows an entire smartwatch 104000 having a housing 104001 that includes at least most of the components of the smartwatch mechanism/hardware and software, a button 104002, a screen 104003 and two horns 104004 and 104005 having attachment means to attach said smartwatch to the corresponding strap/s. FIG. 28, shows a box 104100 made to cover the entire smartwatch 104000. In this example, the box has a housing 104101 to accommodate the entire smartwatch including the horns of the smartwatch. In this example, the wall of the housing has a hole 104103 to accommodate the side button 104002 of the smartwatch. Preferably, the strap uses the smartwatch attachment points/means to attached to the smartwatch. Alternatively, the box/housing includes attachment points/means to attach to the strap. The box has a cover 104102 that preferably has/may-accommodate a watch dial/disc 104104. FIG. 29 shows the smartwatch 104000 being accommodated within the box (e.g. housing) 104100. In this example, the box cover 104202 is in open position. In this example, the strap 104203 remains attached to the smartwatch body. FIG. 30 shows the cover 104301 of the box in closed position by using the hinge 104303. When the cover is in closed position, preferably the watch hands 14304 become small and locate on the portion of the display unit corresponding to the hole 104305 of the dial 104302.

By using the above-mentioned principles, any/most of the regular/current smartwatches may be transformed to luxury smartwatches without interfering with the smartwatch manufacturers.

Figure 31:
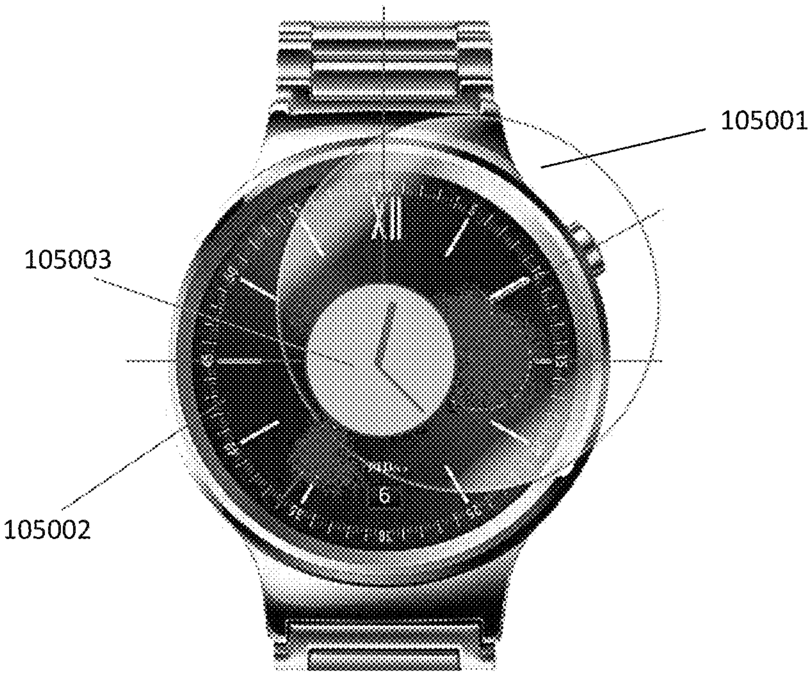
FIGS. 31-32, show the principles of integrating a glass within a cover in accordance with different exemplary embodiments of the invention.
Figure 32:
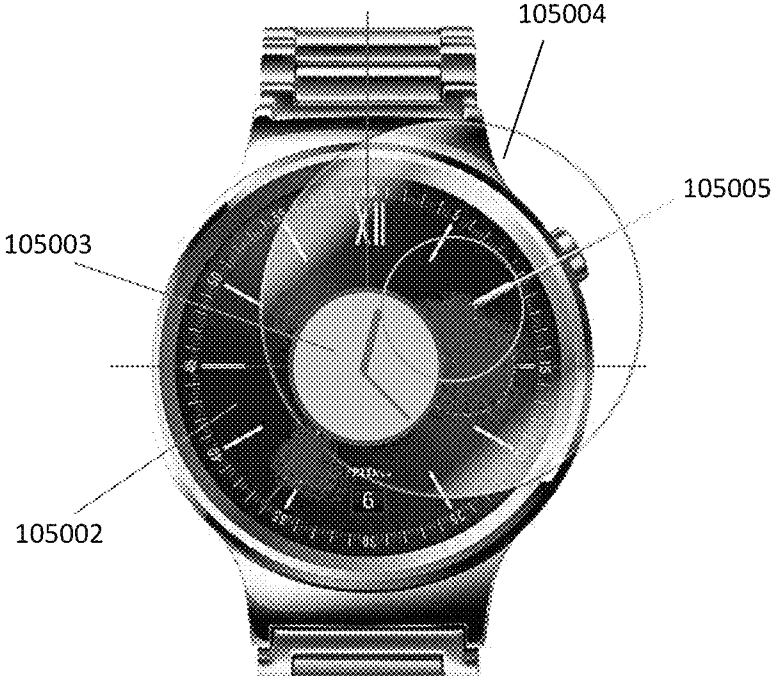

Note that at least a portion of the cover of the box may be covered by a (e.g. transparent) glass. For example, the portion of the cover that has a (e.g. one or more) hole may not be covered by a glass and the rest of the cover may be covered by a glass. Alternatively, the entire cover (e.g. including the hole/s) may be covered by a glass. As shown in FIG. 31 a glass 105001 may be used to cover substantially the entire surface of the cover 105002 including the hole 105003 in/of the cover, while as shown in FIG. 32 a glass 105004 having a hole 105005 corresponding to the hole 105003 of the cover 105002 may be used to (e.g. partially) cover the surface of the cover 105002 (e.g. excluding the (e.g. surface of the) hole 105003 of the cover).

Optionally said glass may be a touch screen. Said touch screen may be controlled by or be related to the processor of the smartwatch. According to one aspect, the cover may have its own touch screen/display.

One of the advantages of covering/using a regular/available smartwatch is that the provider/manufacturer of the box does not have to supply after-sale support for the smartwatch because such support may be supplied by the manufacturer of the smartwatch.

The hinge used to open or close the cover may be located anywhere. According to one embodiment, the cover may start from a hinge of the strap of the watch box and use said hinge to open or close the cover.

Note that the components of the smartwatch may not form a module. In this case, said components may be integrated separately and preferably connectedly (e.g. together) in the housing and/or in the cover of the box.

Note that to simplify the drawings, in some of the drawings the hinges attaching the cover and the housing are not shown but are preferably considered to exist in those drawings.

According to one embodiment, the smartwatch may have an alerting means to inform the user about an event. Said event may be of any kind such as an incoming call, a reminder, etc. Said alerting means may be of any kind such as a vibrator, a sound, an image, a mechanical means installed in the watch box and/or in the smartwatch touching (e.g. repeatedly) the user's skin, etc.

According to one embodiment, a (e.g. preferably rechargeable battery) power source may supply power only/mainly to (e.g. calculate and/or) display a time content output (e.g. preferably by displaying a watch hands (only) or optionally by displaying a watch face). Said (battery) power source may herein be referred to as the watch battery. Preferably, said time content output (e.g. watch hands) has a small form factor adapted to a predefined hole and is printed on a corresponding location of the smartwatch surface. Preferably, said time content output is displayed when the cover is in closed position. By displaying (e.g. only) a reduced size watch face/hands preferably (e.g. only) when the cover is in closed position, said watch battery may last long time (e.g. upon a single charge). The watch battery may preferably be separate from the power source of the smartwatch (e.g. herein may be referred to as the main battery) which supplies power for smartwatch functionalities (e.g. processing, displaying contents including time, etc.). By considering that a smartwatch's most popular function is showing time, most of the time, when the main battery is empty or turned off, the luxury smartwatch will/may continue to show time, working as a/similar to a regular (wrist) watch. Preferably, the watch battery is integrated within the smartwatch module. Optionally the watch battery is integrated anywhere else such as in the watch box or in the strap.

According to one embodiment, one side of the cover of the box of the smartwatch may have a display unit connected to the smartwatch to display the/a content of the smartwatch. The other side of the cover of the smartwatch may include a regular (e.g. physical) watch. Said cover may be rotatable relating to the housing of the smartwatch so that the use can rotate the face of the luxury smartwatch from displaying time to displaying smartwatch output or vice versa.

According to one embodiment, the front side of a luxury smartwatch may have a/the display unit of the smartwatch and the backside of said luxury smartwatch may show time (e.g. be covered by a regular wristwatch). In this case, according to one aspect, the luxury smartwatch may entirely be rotated on the wrist to show time or alternatively to show the output content of the smartwatch.

It is understood that the embodiments in this patent application are exemplary. Based on the principles described herein, other methods/system of transforming a smartwatch into a luxury item may be considered by people skilled in the art.

Note that in this application, the terms "watch face", "watch dial" and "watch hands" are used to explain some of the principles of the invention. In general/preferably, the term "watch face" may preferably be referred to a watch dial together with the watch hands, and the term "watch dial" may preferably be referred to a watch face (virtual or physical) excluding the watch hands or it may preferably be referred to a surface (virtual or physical) that shows/includes the digits or other signs (e.g. bars) that represent hours (e.g. 1 to 12).

Thus, while there have been shown and described and pointed out fundamental novel features of the invention as applied to alternative embodiments thereof, it will be understood that various omissions and substitutions and changes in the form and details of the disclosed invention may be made by those skilled in the art without departing from the spirit of the invention.

I claim:

1. A smartwatch device, comprising:

a smartwatch module, wherein said smartwatch module has a display unit, a housing to removably accommodate said smartwatch module, wherein said housing has a cover and wherein said cover is openable and closable, and wherein said cover has a window such that when said cover is in closed position a time content adapted to said window is displayed on said display unit wherein at least a portion of said time content is visible through said window, and wherein said smartwatch module has an operating system and an alerting means to inform the operating system whether the cover is in closed position or in open position, and wherein said cover has a physical watch dial and said time content are virtual watch hands, wherein when said cover is in closed position said physical watch dial and said virtual watch hands, together, show time.

2. The device of claim 1, wherein said virtual watch hands are adapted to the size of the window.

3. The device of claim 1, wherein said window is not centered within said cover.

4. A smartwatch device, comprising:

a smartwatch module, wherein said smartwatch module has a display unit, a housing to removably accommodate said smartwatch module, wherein said housing has a cover and wherein said cover is openable and closable, and wherein said cover has a window such that when said cover is in closed position a time content adapted to said window is displayed on said display unit wherein at least a portion of said time content is visible through said window, wherein said smartwatch module has an operating system and an alerting means to inform the operating system whether the cover is in closed position or in open position, and wherein when said cover is in open position said smartwatch module displays virtual contents of a smartwatch regardless of said cover, and wherein when said cover is in closed position said smartwatch module displays time in regard to said cover.

5. A smartwatch device, comprising:

a smartwatch module, wherein said smartwatch module has a display unit, a housing to removably accommodate said smartwatch module, wherein said housing has a cover and wherein said cover is openable and closable, and wherein said cover has a window such that when said cover is in closed position a time content adapted to said window is displayed on said display unit wherein at least a portion of said time content is visible through said window, wherein said smartwatch module has an operating system and an alerting means to inform the operating system whether the cover is in closed position or in open position, and wherein said smartwatch module uses a first battery power source for displaying output contents of the smartwatch when said cover is in open position, and wherein said smartwatch module uses a second battery power source, separately from the first battery power source, for displaying the time content when the cover is in closed position.

* * * * *